US006581238B1

(12) United States Patent
Sevellec

(10) Patent No.: US 6,581,238 B1
(45) Date of Patent: Jun. 24, 2003

(54) MOTOR VEHICLE WIPER

(75) Inventor: Pierre Sevellec, Courmon (FR)

(73) Assignee: Valeo System d'Essuyage, Cedex (FR)

( * ) Notice: Subject to any disclaimer, the term of this patent is extended or adjusted under 35 U.S.C. 154(b) by 0 days.

(21) Appl. No.: 09/381,998

(22) PCT Filed: Jan. 26, 1999

(86) PCT No.: PCT/FR99/00148

§ 371 (c)(1),
(2), (4) Date: Jan. 31, 2000

(87) PCT Pub. No.: WO99/37514

PCT Pub. Date: Jul. 29, 1999

(30) Foreign Application Priority Data

Jan. 27, 1998 (FR) .............................. 98 00958

(51) Int. Cl.[7] .............. B60S 1/32; B60S 1/34
(52) U.S. Cl. .................. 15/250.351; 15/250.34; 220/324
(58) Field of Search .............. 15/250.351, 250.34, 15/250.352, 250.31, 257.01; 220/324, 810, 811, 833, 834, 836, 840

(56) References Cited

U.S. PATENT DOCUMENTS

| 4,282,983 A | * | 8/1981 | Swartzbaugh | .............. 220/324 |
| 4,349,120 A | * | 9/1982 | DiNardo | .............. 220/324 |
| 4,502,178 A | | 3/1985 | Ragot et al. | .............. 15/250.34 |
| 5,887,744 A | * | 3/1999 | Mejias | .............. 220/324 |
| 6,003,925 A | * | 12/1999 | Litke et al. | .............. 220/324 |

FOREIGN PATENT DOCUMENTS

| EP | 0 209 276 | | 1/1987 | |
| EP | 0 628 457 | | 12/1994 | |
| FR | 2543897 | * | 10/1984 | .............. 15/250.34 |
| FR | 2 550 147 | | 2/1985 | |
| GB | 1435778 | * | 5/1976 | .............. 15/250.34 |
| GB | 2 151 465 | | 7/1985 | |
| GB | 2188537 | * | 10/1987 | .............. 15/250.34 |
| WO | 82/02692 | | 8/1982 | |
| WO | 10561 | * | 9/1990 | .............. 15/250.34 |

* cited by examiner

Primary Examiner—Gary K. Graham
(74) Attorney, Agent, or Firm—Morgan & Finnegan LLP

(57) ABSTRACT

The invention proposes a motor vehicle windscreen wiper of the type in which a cover, intended completely to cover over a drive head, includes two longitudinal lateral flanks joined together by a transverse back which includes an upper longitudinal part and a downwards-curved part at its rear end. The transverse back of the cover includes an aperture giving access to means for fixing the drive head onto the end of an alternating-sweep drive shaft. A cap is provided, the contour of which is complementary to that of the aperture, which is mounted articulated on the cover between a service position in which it blocks off the aperture and an open raised position in which the aperture is clear.

36 Claims, 4 Drawing Sheets

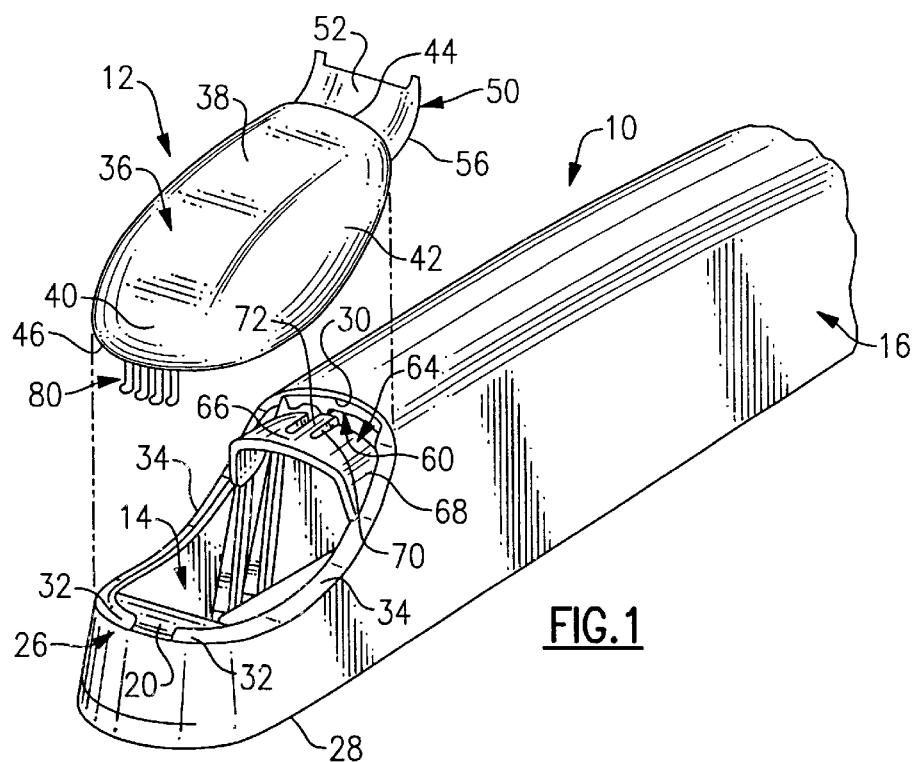
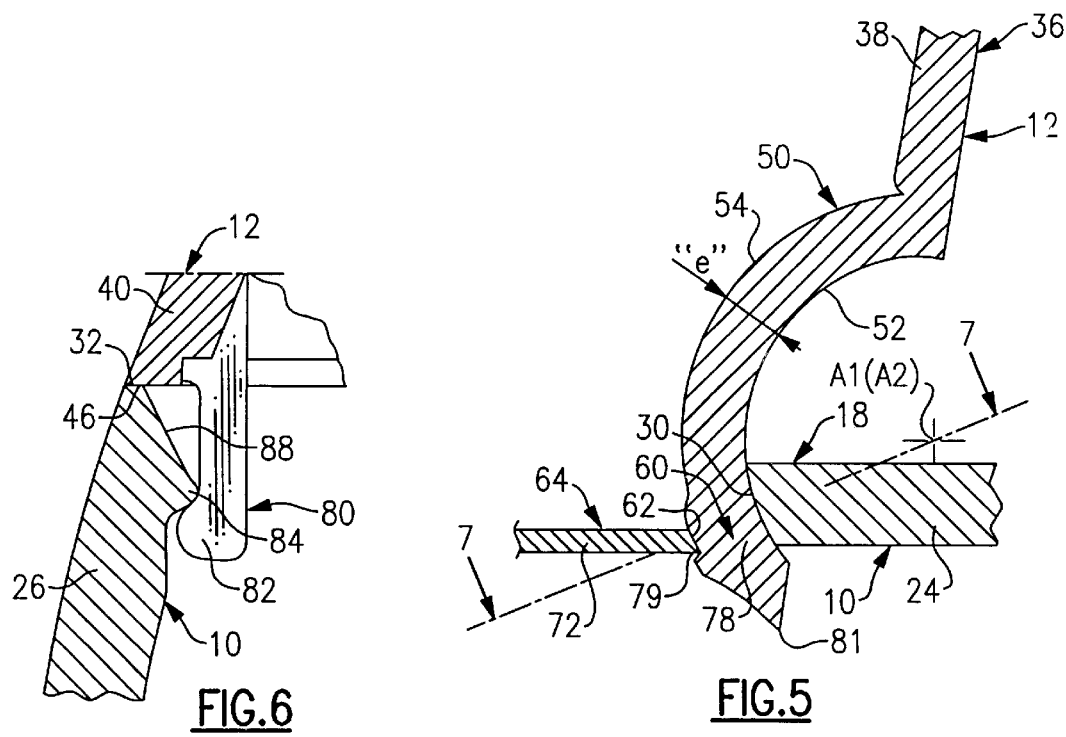

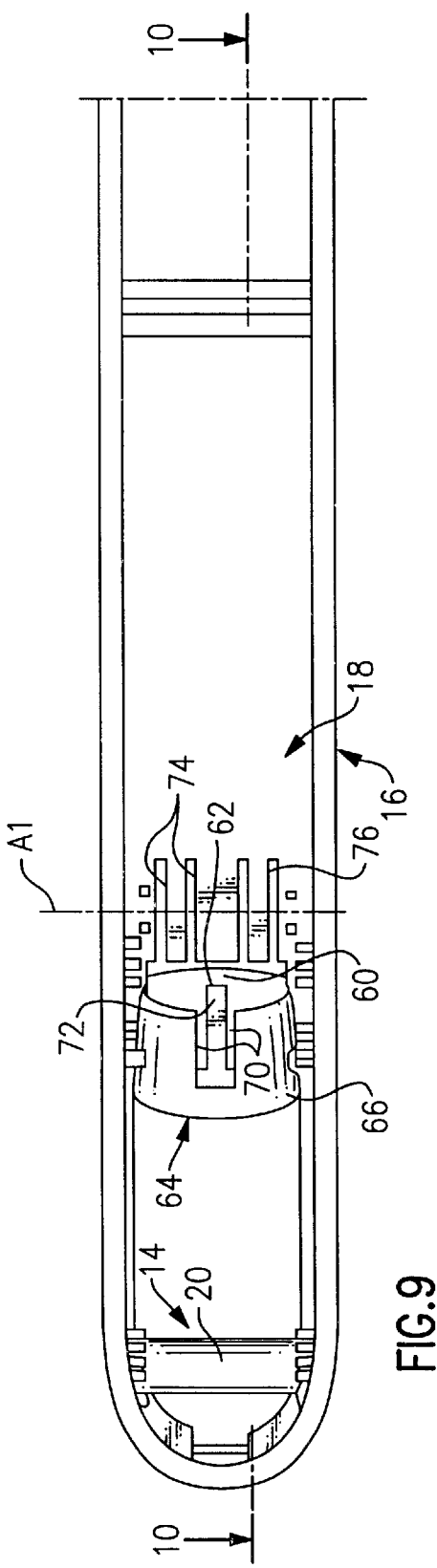
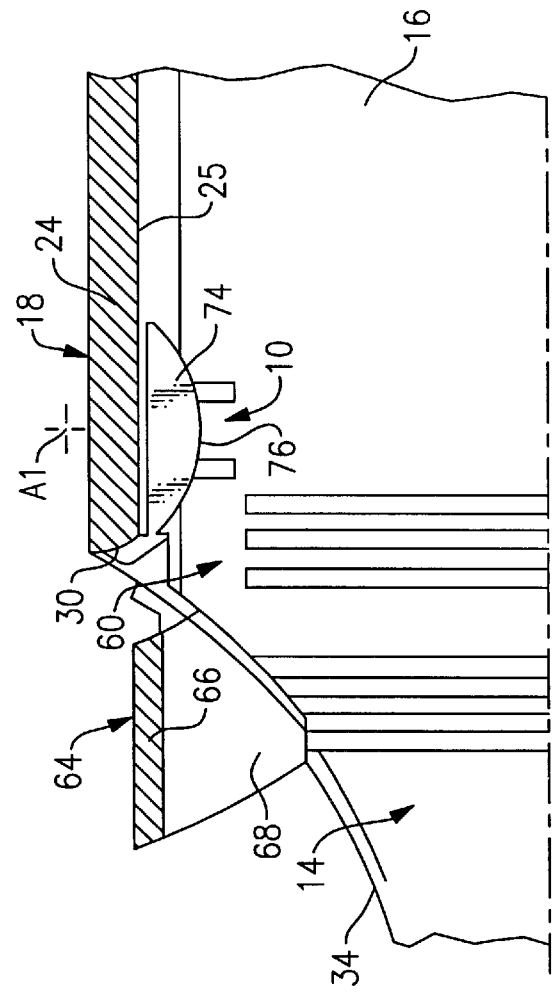

MOTOR VEHICLE WIPER

BACKGROUND OF THE INVENTION

The present invention relates to a motor vehicle windscreen wiper.

The invention relates more particularly to a windscreen wiper of the type in which a cover is intended completely to cover an alternating-sweep drive head for a windscreen wiper blade with respect to which it is mounted articulated about a transverse axis, between a service position and a raised position, of the type in which the cover includes two longitudinal lateral flanks joined together by a transverse back which includes an upper longitudinal part and a downwards-curved part at its rear end.

Many examples of such a design of a windscreen wiper are known in which, in order to improve the appearance of the rear longitudinal part of the windscreen wiper which is mounted on the free upper end of a drive shaft, and so as to protect the elements for fixing the windscreen wiper to the drive shaft, a trim cover arrangement is provided according to the above-mentioned design.

According to a first design, the trim and protective cover may be a piece applied directly onto the body of the drive head and which is independent of the other components of the windscreen wiper.

The trim cover may be mounted so as to move with respect to the rear longitudinal part of the windscreen wiper arm which is mounted articulated on the drive head about a transverse axis.

According to yet another design, the cover may consist of the rear longitudinal part of the windscreen wiper arm proper, which is shaped into a casing and which is articulated onto the drive head about a transverse axis arranged in proximity to the rear longitudinal end of the windscreen wiper arm.

Whatever the design, it is desirable, at least after the windscreen wiper is first mounted on the vehicle, or with a view to allowing this first mounting, to be able to gain access to the means for fixing the drive head onto the end of the drive shaft, without requiring dismantling of the various components of the windscreen wiper, and particularly of the windscreen wiper arm, which is generally stressed by a wiping spring, the fitting and the removal of which are particularly complicated.

BRIEF SUMMARY OF THE INVENTION

With this aim, the invention proposes a windscreen wiper of the abovementioned type, characterised in that the transverse back of the cover includes an aperture giving access to means for fixing the drive head onto the end of an alternating-sweep drive shaft, and in that a cap is provided, the contour of which is complementary to that of the aperture, which is mounted articulately on the cover between a closed service position in which it blocks off the aperture and an open raised position in which the aperture is clear.

According to other characteristics of the invention:

- the cap is mounted articulated on the cover about a transverse axis arranged in the vicinity of the front transverse edge of the aperture;
- the means for articulating the cap onto the cover include an articulation tab with a circular-arc profile, with a concave upper face, which is guided in circular sliding in a slot with a profile complementary to that of the cover;
- the articulation tab extends longitudinally forwards from the front transverse edge of the cap and is accommodated in a guide slot formed in the vicinity of the front transverse edge of the aperture;
- the concave upper face of the articulation tab is smooth and is guided in circular sliding by convex circular guide surfaces consisting of the free edges of several longitudinal and parallel guide cheeks formed facing the inner face of the upper longitudinal part of the transverse back;
- the convex lower face of the articulation tab includes two longitudinal reinforcing ribs arranged along the lateral edges of the articulation tab;
- the guide slot is delimited longitudinally by a segment of the front transverse edge of the aperture and by a segment of a parallel transverse edge belonging to a crosspiece of the cover;
- the crosspiece of the cover includes an elastically deformable longitudinal tongue the edge of the free front end of which constitutes the said parallel transverse edge which delimits the guide slot;
- the edge of the free front end of the tongue interacts with a notch formed on the lower face of the articulation tab, in the vicinity of the free front end of the latter, so as to constitute an end stop which determines the raised angular position of the cap and retains the articulation tab in the guide slot;
- the free front end of the articulation tab is shaped as a wedge in order to cause the tongue to disappear when the cap is fitted on the cover;
- elastic means are provided for locking the cap in its closed position;
- the elastic locking means include at least one elastic locking strip which extends vertically downwards from the rear transverse edge of the cap and the free end of which includes a locking nose which interacts with a rib arranged face-to-face in the inner face of the curved rear part of the back of the cover;
- the aperture is delimited by a front transverse edge formed in the longitudinal upper part of the back and by a rear transverse edge which is formed in the downwards-curved rear part of the back and which is offset vertically downwards with respect to the front transverse edge;
- the aperture is delimited by two longitudinal edges formed in the two longitudinal lateral flanks;
- the cover is a rear casing-shaped part of an arm which carries a windscreen wiper blade.

BRIEF DESCRIPTION OF THE DRAWINGS

Other characteristics and advantages of the intention will emerge on reading the detailed description which follows, for an understanding of which reference will be made to the attached drawings in which:

FIG. 1 is a view in perspective of an exemplary embodiment of the invention in which the cover consists of the rear casing-shaped part of a windscreen wiper arm and on which the cap is illustrated in exploded position above the aperture of the cover;

FIGS. 5 and 6 are larger-scale views of the details D5 and D6 of FIGS. 2 and 3;

FIG. 9 is a bottom view of the rear part forming the cover of the windscreen wiper arm illustrated in FIG. 1; and FIG. 10 is a larger-scale detailed view taken in section along the line 10—10 of FIG. 9.

DETAILED DESCRIPTION OF THE INVENTION

Figure 2:
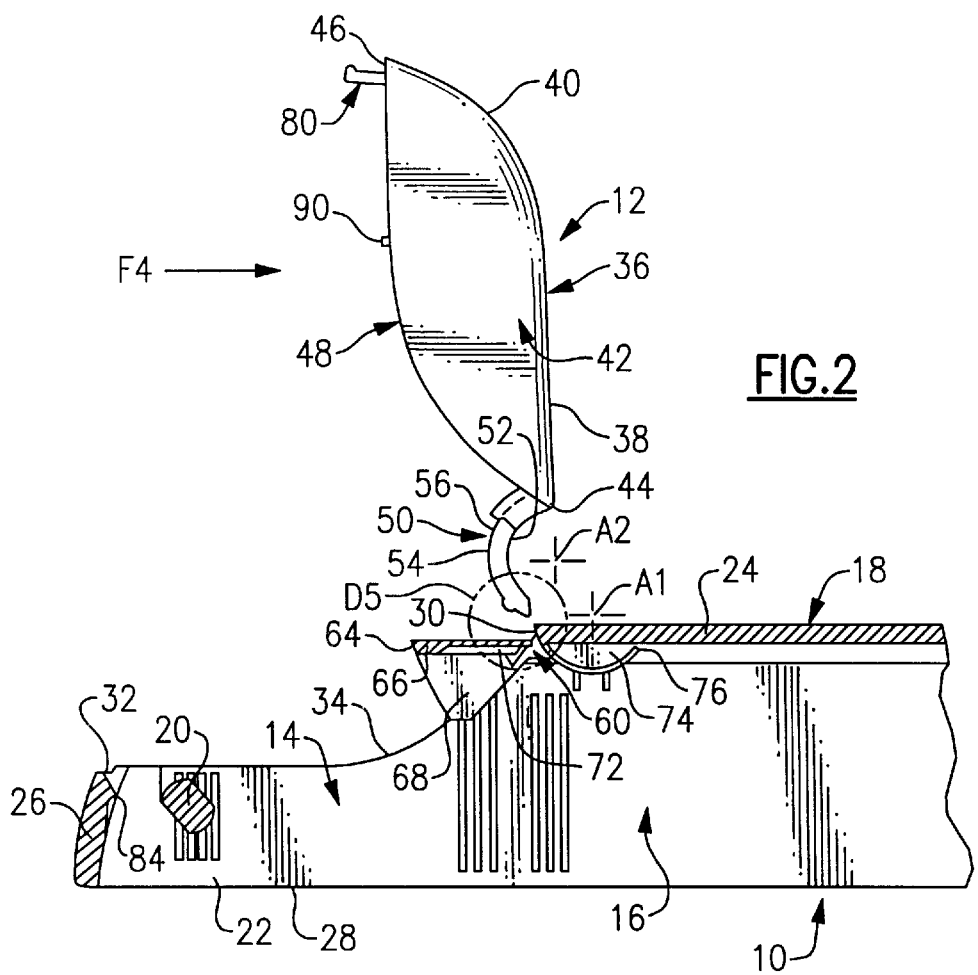
FIG. 2 is a view in cross-section through the central vertical plane of the cover and on which the cap is illustrated in exploded position in its vertical orientation with a view to fitting it onto the cover.

In the description which will follow, identical or similar components are designated by the same reference numbers, and the terms "vertical", "horizontal", "upper", "lower" will be employed by reference to the orientation of the pieces as they are illustrated in the various figures.

A rear longitudinal part has been represented in the figures, in the shape of a cover 10 which here belongs to a windscreen wiper arm, not represented in detail, the front longitudinal end (not represented) of which generally carries a wiper blade for a window to be wiped.

In accordance with the teachings of the invention, the upper rear part of the cover 10 is combined with an articulated cap 12 which is provided to close off an aperture 14 of the cover making it possible to gain access to the means for fixing a drive head (not represented) of the windscreen wiper onto a shaft (not represented) for rotational alternating-sweep driving.

According to a known general design, the cover 10 consists in essence of two longitudinal lateral flanks 16 which extend parallel in vertical planes and which are joined together by a transverse back 18.

Figure 3:
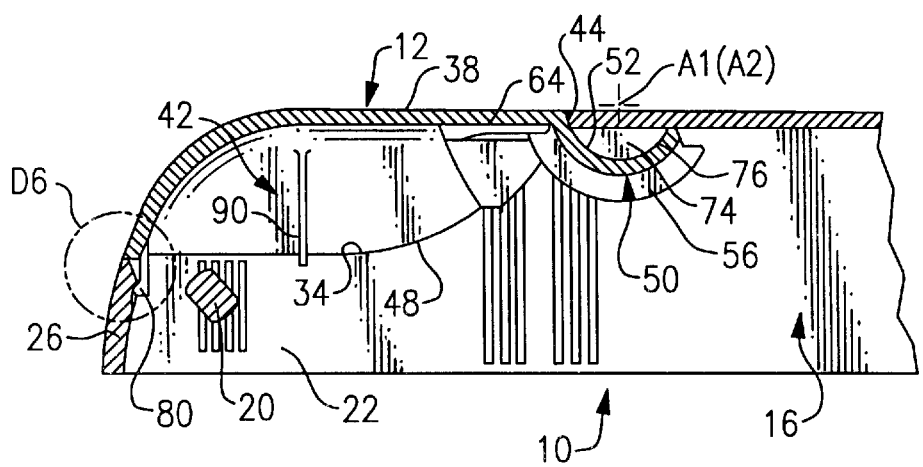
FIG. 3 is a view similar to that of FIG. 2 in which the cap is illustrated in closed and locked position.
Figure 4:
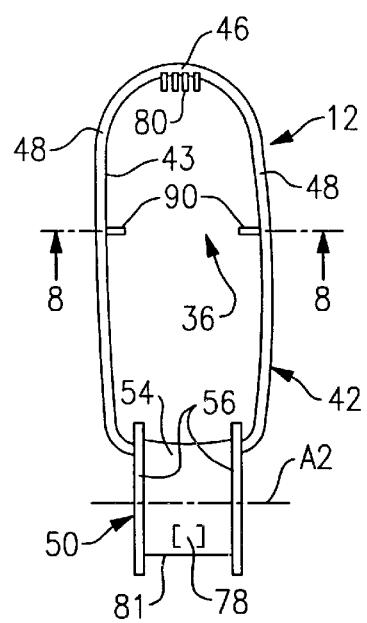
FIG. 4 is a view of the cap along the arrow F4 of FIG. 2.

According to a known design, the cover 10 is a molded part, made of plastic for example, and it includes, in the vicinity of its rear longitudinal end, to the left when looking at FIGS. 2 and 3, a transverse axis 20 of articulation of the cover onto the drive head which links together the opposing internal faces 22 of the lateral flanks 16 of the cover 10.

The transverse back 18 consists in essence of an upper longitudinal part 24 which extends in a substantially horizontal plane and which is extended longitudinally rearwards by a downwards-curved rear end part 26 which joins together the lateral flanks 16 in such a way that the casing forming a cover 10 is delimited vertically downwards by a continuous lower edge 28 situated in a horizontal plane parallel to the general plane of the upper longitudinal part 24 of the back 18.

As can be seen particularly in FIGS. 1 to 3, the rear longitudinal and upper part of the cover 10 is "pierced" by the aperture 14, produced from the same material by molding, which is delimited longitudinally by a front transverse edge 30 and by a rear transverse edge 32.

The front transverse edge 30 is formed in the upper longitudinal part 24 of the back 18 while the rear transverse edge 32, which is offset vertically downwards with respect to the front transverse edge 30, is formed in the downwardly-curved rear part 26.

The aperture 14 is also delimited laterally by two longitudinal edges 34 which are formed in the lateral flanks 16.

As can be seen in FIGS. 1 to 4, the cap 12, which is also a piece molded for example from plastic, which is complementary with the form and with the general profile of the rear end part of the cover 10 and its lower contour is complementary particularly with the contour of the aperture 14 consisting of the edges 30 to 34.

Hence the cap 12 exhibits a shell shape consisting of an upper back 36 which includes a front part 38 of longitudinal and horizontal orientation and a downwardly-curved rear part 40, which joins two longitudinal flanks 42 together.

The lower contour of the cap 12 is delimited by front transverse edge 44, a rear transverse edge 46 and by two longitudinal edges 48.

As can be seen in FIG. 3, in the closed service position, and because of the complementary of the lower contour of the cap 12 and of the contour of the aperture 14, the cap 12 perfectly completes the cover 10 which is presented with a uniform and continuous profile.

In accordance with the teachings of the invention, the cap 12 is mounted articulately or proxtally onto the cover 10 between a closed horizontal service position, illustrated in FIG. 3, and a raised open position illustrated in FIG. 5.

In the example illustrated in the figures, the cap 12 is articulated with respect to the cover 10 about a horizontal axis of transverse orientation A1 which is arranged in the vicinity of the front transverse edge 30 of the aperture 14 and which is offset longitudinally forwards with respect to the latter.

In order to obtain this articulation, the cap 12 includes an articulation tabbing 50.

The lug 50 is produced by molding, from the same material as the cap 12 and extends overall longitudinally forwards from the front transverse edge 44 of the cap 12.

The lug 50 exhibits a profile curved in a circular arc and it is delimited by an upper face 52 in a concave cylindrical arc and by a parallel lower face in a convex cylindrical arc 54. These two cylindrical-arc surfaces are centred about a transverse axis A2 which is offset longitudinally forwards with respect to the front transverse edge 44 and which, in the mounted position of the cap 12 on the cover 10, is coincident with the axis A1 of articulation and pivoting of the cap 12 with respect to the cover 10.

The articulation tab 50 is reinforced by two longitudinal reinforcing ribs 56 which extend vertically downwards from the lateral longitudinal edges of the curved articulation tab 60.

In order to provide pivoting movement of the cap 12 about the common axis A1, A2, the curved articulation tab 50 is guided so as to slide in the slot 60 of the cover 10.

More precisely, the slot 60 is formed in the up per longitudinal part 24 of the back 18 and it is delimited, on the one hand, by the front transverse edge 30 of the aperture 14 and, on the other hand, by a parallel rear transverse edge portion 62 which belongs to a transverse strut 64 of the cover 10.

The two face-two-face edges 30 and 62 which delimit the slot 60 are, as can be seen more particularly in FIG. 5, of a cylindrical-arc profile, that is to say that the edge 30 is convex while the edge 60 is concave, in such a way as to delimit a slot profiled in a circular-arc profile along radii which are complementary to those of the cylindrical-arc surfaces 52 and 54 of the transverse structor tab 50.

The crosspiece 64 is a piece produced from the same material by molding with the cover 10, which exhibits a "visor" shape which extends partly into the aperture 14 behind the front transverse edge 30 and which is offset vertically downwards with respect to the upper longitudinal part 24 of the back 18.

The crosspiece 64 consists in essence of a thin upper plate 66 which extends parallel to the part 24 of the back 18 and which is linked to the cover 10 by two longitudinal lateral wings 68. In its central part, the horizontal main plate 66 of the crosspiece 64 includes two parallel slots 70 which between them delimit a tongue 72 which constitutes an elastically deformable beam, embedded by its rear longitudinal end, the free front end of which includes a segment of the edge 62 of the slot 60 which interacts with the central part of the convex-cylindrical-arc lower surface 54 of the articulation tab 50.

In addition to the shaping of the slot 60 with its edges 30 and 62, the pivoting guidance of the articulation tab 50 about the common axis A1, A2 is supplemented by four guide cheeks 74 which extend in vertical and longitudinal planes within the cover 10, from the inner face 25 of the upper longitudinal part 24 of the back 18, as can be seen particularly in FIG. 10.

The four cheeks are parallel and are arranged in the vicinity of the front transverse edge 30 of the aperture 14, and each of them is delimited by a lower longitudinal edge 76 in a circular arc centred on the axis A1.

The four edges 76 thus overall constitute a convex cylindrical-arc surface, for guiding the articulation tab 50 which interacts with the concave cylindrical-arc upper face 52 of the lug 50.

The width of the slot 60, that is to say the distance normally separating the edges 30 and 62, is substantially equal to the average thickness "e" (see FIG. 5) of the main part of the articulation tab 50.

However, as can be seen in FIG. 6, the free front end part 78 of the articulation tab 50 exhibits an over thickness in such a way as to constitute a retention by pinching which makes it possible to hold the cap 12 in its raised open position illustrated in FIG. 5 without falling back inadvertently towards its closed horizontal position of FIG. 3.

In addition to the thicker part 76, a notch 79 is provided in the lower face 54 in order to avoid the accidental escape of the cap 12 in the event that it is stressed in rotation about the axis A1, in the clockwise direction, beyond its raised position illustrated in FIG. 5.

The engaging of the thicker part 78 of the slot 60 is made possible by virtue of the capacity of the tongue 62 to be deformed elastically in the manner of an elastic beam.

Likewise, the fitting by engaging the articulation tab 50 into the slot 60 is facilitated by the wedge shaping 81 of its free front end, the wedge profile causing the temporary disappearance of the tongue 72 by deflection, vertically downwards, considering FIG. 5, of the latter until it passes through the notch 79.

In accordance with another aspect of the invention, means are also provided for locking the cap 12 in the closed service position.

These locking means consist here of a series of four elastically deformable strips 80 which extend vertically downwards from the rear transverse edge 46.

The lower free end of each elastic strip 80 includes a nose 82, oriented longitudinal rearwards, which is capable of interacting by hooking on below a horizontal rib 84 formed in the inner face 86 of the curved rear part 26 as can be seen particularly in FIG. 6.

The rounded shape of the noses 82 allows them to be engaged automatically behind the rib 84 by interaction with an insertion ramp 88 and allows them to be freed automatically when it is desired to open the cap 12 by pulling the latter vertically upwards overall in order to cause it to pivot about the axis A1.

Figure 8:
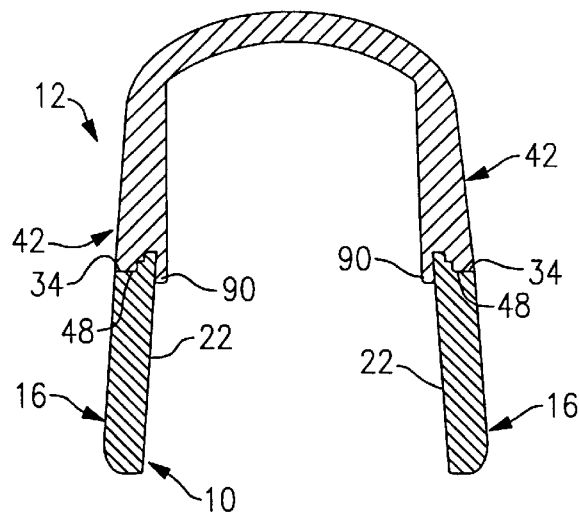
FIG. 8 is a large-scale sectional view in cross-section along the line 8—8 of FIG. 4 in which the cap is illustrated in position closed and locked on the cover.
Figure 7:
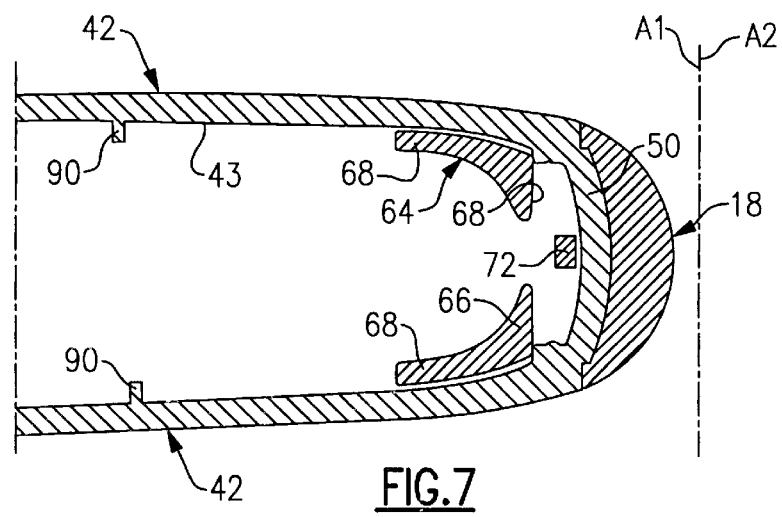
FIG. 7 is a view in section, on a smaller scale, along the line 7—7 of FIG. 5, and in which the cap is illustrated in closed position.

The correct leak tight closure of the cap 12 is completed, as can be seen particularly in FIG. 8, by the complementary zigzag-shaped profile of the face-two-face edges 48 of the flanks 42 of the cap 12 and 34 of the flanks 16 of the cover 10.

In order to avoid the flanks 42 inadvertently moving apart transversely upwards, the inner faces 43 of the flanks 42 of the cap 12 each include a vertically-oriented rib 90 which projects vertically downwards and which extends opposite the facing part of the inner face 22 of the flank 16 associated with the cover 10.

What is claimed is:

1. A motor vehicle windscreen wiper comprising:

a cover for completely covering an alternating-sweep drive head for a windscreen wiper blade with respect to which it is mounted articulately about a transverse axis, between a service position and a raised position, the cover comprising two longitudinal lateral flanks joined by a transverse back having an upper longitudinal part and a downwardly-curved part at a rear end, the transverse back of the cover having an aperture for giving access to means for fixing the drive head onto the end of an alternating-sweep drive shaft; and a cap having a contour complementary to a contour of the aperture, the cap being mounted articulated on the cover between a closed service position in which the cap blocks off the aperture and an open raised position in which the aperture is clear, a means for articulating the cap onto the cover comprising an articulation tab with a circular-arc profile and a concave upper face, the tab being slidably guidance in an arcuate guide slot with a profile complementary to the profile of the tab.

2. A windscreen wiper according to claim 1, wherein the cap has a front transverse edge and the articulation tab extends longitudinally forwards from the front transverse edge of the cap and the guide slot is formed in the cover in the vicinity of the front transverse edge of the aperture.

3. A windscreen wiper according to claim 2, wherein the concave upper face of the articulation tab is smooth and is guided in circular sliding by convex circular guide surfaces comprising free edges of several longitudinal and parallel guide cheeks facing an inner face of the upper longitudinal part of the transverse back.

4. A windscreen according to claim 3, wherein the convex lower face of the articulation tab includes two longitudinal reinforcing ribs arranged along the lateral edges of the articulation tab.

5. A windscreen wiper according to claim 2, wherein the cover further comprises a cross-piece with a transverse edge and the guide slot is delimited longitudinally by a segment of the front transverse edge of the aperture and by a segment of a transverse edge belonging to a crosspiece of the cover, the transverse edge of the crosspiece being parallel to the front transverse edge of the aperture.

6. A windscreen wiper according to claim 5, wherein the crosspiece of the cover includes an elastically deformable longitudinal tongue having a free front end with an edge constituting said transverse edge which delimits the guide slot.

7. A windscreen wiper according to claim 6, wherein the edge of the free front end of the tongue interacts with a notch formed on the lower face of the articulation tab, in the vicinity of the free front end of the articulation tab, so as to constitute an end stop which determines the raised angular position of the cap and retains the articulation tab in the guide slot.

8. A windscreen wiper according to claim 6, wherein in the free front end of the articulation tab is shaped as a wedge in order to cause the tongue disappear when the cap is fitted on the cover.

9. A motor vehicle windscreen wiper comprising:
 a cover for completely covering an alternating-sweep drive head for a windscreen wiper blade with respect to which it is mounted articulately about a transverse axis, between a service position and a raised position, the cover comprising two longitudinal lateral flanks joined by a transverse back having an upper longitudinal part and a downwardly-curved part at a rear end, the transverse back of the cover having an aperture for giving access to means for fixing the drive head onto the end of an alternating-sweep drive shaft;
 a cap having a contour complementary to a contour of the aperture, the cap being mounted articulated on the cover between a closed service position in which the cap blocks off the aperture and an open raised position in which the aperture is clear; and
 elastic means for locking the cap in its closed position, wherein the elastic means include at least one elastic locking strip which extends vertically downwards from a rear transverse edge of the cap, the locking strip having a free end including a locking nose which interacts with a rib arranged face-to-face in the inner face of the curved rear part of the back of the cover.

10. A windscreen wiper cover for a drive head of a windscreen wiper blade, comprising:
 a body portion defining an aperture therethrough, the aperture having an edge with a contour; and
 a cap having an edge with a contour matching the contour of the edge of the aperture, the cap being pivotally mounted to the body portion, to move between a first position wherein the cap edge is brought into contact with the edge of the aperture, closing the aperture, and a second position, wherein the cap edge is not in contact with the edge of the aperture, opening the aperture,
 further the cap comprises a lug with a circular-arc profile and a concave upper face, and the body portion defines a guide slot with a profile complementary to the profile of the lug for receiving the lug, wherein the lug is pivotally mounted to the body portion by sliding engagement with the slot, the lug sliding about an arc defined by the profile of the slot; also
 the body portion has an inner surface, the cover further comprising convex circular guide surfaces comprising free edges of a plurality of parallel guide cheeks extending substantially perpendicular to the guide slot, from the inner surface of the body portion, one end of each guide surface being adjacent to the guide slot, and the free edges of the guide cheeks continuing the arc defined by the guide slot for guiding the lug about the arc.

11. A windscreen wiper cover according to claim 10, wherein the body portion comprises two longitudinal lateral flanks joined by a transverse back having an upper longitudinal portion, the aperture being defined in the transverse back, and further wherein the concave upper face of the lug is smooth and the guide cheeks extend from an inner surface of the longitudinal part of the traverse back.

12. A windscreen wiper cover according to claim 11, wherein the lug extends longitudinally forwards from a front transverse edge of the cap and the guide slot is formed proximate the front transverse edge of the aperture.

13. A windscreen wiper cover according to claim 12, further comprising a crosspiece having a transverse edge parallel to a transverse edge of the aperture and connected to the body portion for longitudinally delimiting the guide slot.

14. A windscreen wiper cover according to claim 13, further comprising an elastically deformable longitudinal tongue, having a free front end defining the transverse edge of the crosspiece.

15. A windscreen wiper cover according to claim 14, wherein the free front end of the tongue interacts with a notch formed on the lower face of the lug, in the vicinity of the free front end of the lug, to constitute an end stop for determining the raised angular position of the cap and retaining the lug in the guide slot.

16. A windscreen wiper cover according to claim 15, wherein the free front end of the lug is shaped as a wedge to cause the tongue to disappear when the cap is fitted on the body portion.

17. A cover for a drive head of a windscreen wiper blade, comprising:
 a body portion defining an aperture therethrough, the aperture having an edge with a contour;
 a cap having an edge with a contour matching the contour of the edge of the aperture, the cap being pivotally mounted to the body portion to move between a first position wherein the cap edge is brought into contact with the edge of the aperture, closing the aperture, and a second position, wherein the cap edge is not in contact with the edge of the aperture, opening the aperture, the cap comprising a lug with a circular-arc profile and a concave upper face; and
 the body portion defining a guide slot with a profile complementary to the profile of the lug for receiving the lug, wherein the lug is pivotally mounted to the body portion by sliding engagement with the slot, the lug sliding about an arc defined by the profile of the slot, the body portion having an inner surface and at least one guide surface comprising a free edge of a guide cheek extending substantially perpendicular to the guide slot, from the inner surface of the body portion, one end of the guide surface being adjacent to the guide slot, and the free edge of the guide cheek continuing the arc defined by the guide slot for guiding the lug about the arc.

18. A windscreen wiper cover for a drive head of a windscreen wiper blade, comprising:
 a body portion defining an aperture with a contoured edge; and
 a cap with an aperture matching contoured edge, the cap being pivotally mounted to the body portion and articulated between a closed or opened position,
 further the cap comprises a lug with a circular-arc profile and a concave upper face, and the body portion defines a guide slot with a profile complementary to the profile of the lug for receiving the lug, wherein the lug is pivotally mounted to the body portion by sliding engagement with the slot, the lug sliding about an arc defined by the profile of the slot; also
 the cover further comprising convex arcuate guide surfaces comprising free edges of a plurality of parallel guide cheeks extending substantially perpendicular to the guide slot, from an inner surface of the body portion, one end of each guide surface being adjacent to the guide slot, and the free edges of the guide cheeks continuing the arc defined by the guide slot for guiding the lug about the arc.

19. A windscreen wiper cover according to claim 18 wherein the body portion comprises the aperture being defined in a transverse back of the body portion, the concave upper face of the lug is smooth and the guide cheeks extending from an inner surface of the longitudinal part of the transverse back.

20. A windscreen wiper cover according to claim 19, wherein the lug extends longitudinally forward from a front transverse edge of the cap and the guide slot is formed adjacent to the front transverse edge of the aperture.

21. A windscreen wiper cover according to claim 20, further comprising a crosspiece having a transverse edge parallel to a transverse edge of the aperture and connected to the body portion for longitudinally delimiting the guide slot.

22. A motor vehicle windscreen wiper comprising:
   an elongated windscreen wiper arm having an end provided as a cover for a drive head that drives the windscreen wiper arm, said cover having means for mounting articulately to said head for movement about a transverse axis, between a service position and a raised position, a transverse back of the cover having an aperture at said end providing access for fixing the drive head; and
   a cap having a contour complementary to a contour of the aperture, the cap being articulated on the cover between a closed service position in which the cap blocks off the aperture and an open raised position, clearing the aperture, wherein the aperture is delimited by an edge in the cover, the edge having a rear transverse edge portion proximal said end of the cover and a front transverse edge portion situated distal said end of the cover, opposite the rear transverse edge portion, and the cap is pivotally mounted to the cover at said front transverse edge portion, articulated on the cover about a transverse axis.

23. The motor vehicle windscreen wiper in claim 22, further comprising:
   an articulation tab extending from said cap with a circular-arc profile and a concave upper face, the articulation tab being slidably guidable in an arcuate guide slot that has a profile complementary to the profile of the articulation tab.

24. The windscreen wiper according to claim 23, wherein the articulation tab extends longitudinally forwards from the front transverse edge portion of the cap and is positioned in the cover adjacent to the front transverse edge portion.

25. The windscreen wiper according to claim 24, wherein the articulation tab has a smooth concave upper face that is arcuately guided by convex circular guide surfaces comprising free edges of several longitudinal and parallel guide cheeks.

26. The windscreen wiper according to claim 25, further comprising an elastic locking fixture to secure the cap in a closed position.

27. The windscreen wiper according to claim 26 wherein the elastic locking fixture includes at least one elastic locking strip which extends vertically downwards from the rear transverse edge portion of the cap, the locking strip having a free end including a locking nose which interacts with a rib arranged face-to-face in the inner face of the curved rear part of the cover.

28. The windscreen wiper according to claim 22, wherein the rear transverse edge portion formed in a downwardly-curved rear part of the back and is offset vertically downwards with respect to the front transverse edge portion.

29. An elongated windscreen wiper cover for a drive head of a windscreen wiper blade, comprising:
   a body portion of the windscreen wiper cover defining an aperture therethrough at one end thereof, wherein the aperture is delimited by an edge in the body portion, the edge having a rear transverse edge portion proximal said end of the cover and a front transverse edge portion situated distal said end of the cover, opposite the rear transverse edge portion; and
   a cap having an edge with a contour matching the contour of the edge of the aperture, the cap being pivotally mounted to the body portion at the front transverse edge portion of the aperture, and articulated to move between a first position, wherein the cap edge is brought into contact with the edge of the aperture, closing the aperture, and a second position opening the aperture.

30. The windscreen wiper cover according to claim 29, wherein the cap comprises a lug with a circular-arc profile and a concave upper face, and the body portion defines a guide slot with a profile complementary to the profile of the lug for receiving the lug, wherein the lug is pivotally mounted to the body portion by sliding engagement with the slot, the lug sliding about an arc defined by the profile of the slot.

31. The windscreen wiper cover according to claim 30, wherein the body portion has an inner surface, the cover further comprising convex circular guide surfaces comprising free edges of a plurality of parallel guide cheeks extending substantially perpendicular to the guide slot for guiding the lug about the arc.

32. The windscreen wiper cover of claim 31, wherein the body portion comprises two longitudinal lateral flanks joined by a transverse back having an upper longitudinal portion, the aperture defined in the transverse back, wherein the concave upper face of the lug is smooth and the guide cheeks extend from an inner surface of the longitudinal part of a transverse back.

33. The windscreen wiper cover of claim 32, further comprising an elastically deformable tongue, having a free front end defining the transverse edge of the crosspiece.

34. The windscreen wiper cover of claim 33, wherein the free front end of the tongue interacts with a notch formed on the lower face of the lug, adjacent to the free front end of the lug, to constitute an end stop for determining the raised angular position of the cap and retaining the lug in the guide slot.

35. The windscreen wiper cover of claim 34, further comprising an elastic locking fixture to secure the cap in the first position, closing the aperture.

36. The windscreen wiper cover of claim 35, wherein the elastic locking fixture includes at least one elastic locking strip which extends vertically downwards from the rear transverse edge of the cap, the locking strip having a free end including a locking nose which interacts with a rib.

* * * * *